(12) United States Patent
McFarlane et al.

(10) Patent No.: US 9,010,991 B2
(45) Date of Patent: Apr. 21, 2015

(54) SEQUENTIAL START CLUTCH FOR A MATERIAL MIXING MACHINE

(75) Inventors: Claude McFarlane, Fitchburg, WI (US); Chris Albright, Brodhead, WI (US); William Bassett, Brodhead, WI (US)

(73) Assignee: Kuhn North America, Inc., Brodhead, WI (US)

( * ) Notice: Subject to any disclaimer, the term of this patent is extended or adjusted under 35 U.S.C. 154(b) by 1501 days.

(21) Appl. No.: 12/051,506

(22) Filed: Mar. 19, 2008

(65) Prior Publication Data

US 2009/0238032 A1    Sep. 24, 2009

(51) Int. Cl.
| | |
|---|---|
| *B01F 5/12* | (2006.01) |
| *B01F 13/08* | (2006.01) |
| *B01F 11/00* | (2006.01) |
| *B01F 7/08* | (2006.01) |
| *B01F 7/24* | (2006.01) |
| *F16D 48/02* | (2006.01) |

(52) U.S. Cl.
CPC .................. *B01F 7/085* (2013.01); *B01F 7/241* (2013.01); *F16D 48/02* (2013.01)

(58) Field of Classification Search
None
See application file for complete search history.

(56) References Cited

U.S. PATENT DOCUMENTS

| | | | | |
|---|---|---|---|---|
| 3,580,326 | A * | 5/1971 | Edwards | 164/200 |
| 2002/0176321 | A1* | 11/2002 | Knight | 366/314 |
| 2005/0099885 | A1* | 5/2005 | Tamminga | 366/314 |
| 2006/0126430 | A1 | 6/2006 | Cicci et al. | |
| 2006/0214035 | A1 | 9/2006 | Albright et al. | |
| 2006/0256647 | A1 | 11/2006 | Van Der Plas | |

OTHER PUBLICATIONS

Canadian Office Action issued in Canadian Application No. 2,717,924 on Oct. 27, 2014.

* cited by examiner

*Primary Examiner* — Nathan Bowers
(74) *Attorney, Agent, or Firm* — Oblon, McClelland, Maier & Neustadt, L.L.P.

(57) ABSTRACT

A mixer system includes a mixing chamber with a drive panel, open top, discharge opening in a side of the mixing chamber, and door configured to open and close the discharge opening. A first mixing auger is disposed inside the mixing chamber, and a first auger drive is disposed on another side of the drive panel and connected to the first auger through the drive panel and connected to a driveline. A second mixing auger is disposed inside the mixing chamber on the first side of the drive panel, and another auger drive is connected to the second auger through the drive panel. A clutch is connected between the second auger drive and the driveline and configured to mechanically connect and disconnect the second auger drive from the driveline based on an input. A method of sequentially starting different augers within a mixing chamber is provided.

9 Claims, 10 Drawing Sheets

US 9,010,991 B2

SEQUENTIAL START CLUTCH FOR A MATERIAL MIXING MACHINE

BACKGROUND OF THE INVENTION

1. Field of the Invention

This invention relates to a clutch system configured to reduce a load on a power transmission device upon activation. One application of the device relates to a sequential start clutch system applied to a mixing machine such as a feed mixer, manure spreader, or aggregate mixer.

2. Description of the Related Art

Various types of equipment for mixing, chopping, liquefying, or distributing material are available. Some use two or more components configured to rotate. In one agricultural application, a mixing machine uses two or more augers disposed inside a container configured to rotate around separate axes. The augers are typically powered by a common power source such as a power-take-off (PTO) connected to a motor.

It can take a tremendous amount of power to start a multiple auger device when the machine is filled with material, and especially if the device holds a heavy material such as manure, aggregate gravel, cement, or baled hay. Conventional mixers address this issue by providing multi-speed transmissions, 2-speed gearboxes, or speed-up kits to be able to start the augers at a lower rotational speed and then speed up the augers once they are rotating.

The above-noted methods may result in excessive wear of the machine, and torque protection devices such as shear bolts, torque disconnects, and slip clutches have been incorporated into some mixing machines to help protect expensive planetary gearboxes from torque overload. The running loads on some mixers can be very high, and thus can demand very large and expensive torque limiting devices to adequately protect the drive systems from overload.

SUMMARY OF THE INVENTION

Accordingly, one aspect of the present invention provides a device that reduces the startup load placed on the power source or drive train of a mixing or material spreading machine using multiple rotating parts.

One aspect of the invention provides for the use of less than a maximum number for augers, for example, only one auger, during startup, and then starting one or more additional augers later. This arrangement reduces the startup torque, and in effect, staggers the startup of the augers over time. In the case of a two-auger system, delaying the start of the second auger to a time after the first auger is rotating will reduce the startup torque by half when the first and second augers have equal startup torques. One benefit of this arrangement is that the mixer is started with less power, and less stress is placed on the drivelines and power source.

In one embodiment, a clutch is provided to disconnect the input drive from at least one auger. In one example, the clutch can be a spring-applied clutch that is normally engaged and that can be disengaged via hydraulic pressure from the power source. In one example, the clutch is disengaged by applying hydraulic pressure to the clutch from an operator's platform, for example, from a tractor or truck. Rotation of one of the augers is then started via rotational power transmitted from the PTO. In one example, the front auger is engaged first. After the first auger has started rotating, hydraulic pressure on the clutch is released. The clutch engages the second auger in response to the release of pressure, and the second auger starts to rotate. Further augers can be engaged at the same time or after the second auger is engaged.

One aspect of the invention includes a mixer system that has a mixing chamber with a drive panel and an open top. The mixing chamber typically includes a discharge opening in a wall of the mixing chamber. The discharge opening can be on any wall, including the front, right or left side, or rear wall. A door is typically included to open and close the discharge opening. The mixer system further includes a first driveline, a first mixing auger disposed inside the mixing chamber on a first side of the drive panel, a first auger drive disposed on a second side of the drive panel and connected to the first auger through the drive panel and connected to the first driveline, and a second mixing auger disposed inside the mixing chamber on the first side of the drive panel. The system typically includes a second auger drive disposed on the second side of the drive panel and connected to the second auger through the drive panel. A clutch is disposed on the second side of the drive panel and mechanically connected between the second auger drive and the first driveline and configured to mechanically connect and disconnect the second auger drive from the first driveline based on an input. In addition to the second auger drive and second auger, the mixer system can include a third, fourth, and fifth auger drive and auger etc. These additional auger drives and augers can be connected via the same or different clutches so that the additional augers can be sequentially or simultaneously started in any combination with the first and second augers.

Another aspect of the invention includes a method of controlling a drive system with multiple driven rotating members. The method includes disengaging a clutch connected to a first output of a first gearbox, and, after the clutch is disengaged, supplying rotational power to the first gearbox. The method further includes transmitting at least a portion of the rotational power from the first gearbox to a second gearbox via a second output of the first gearbox. Additionally, the method includes rotating a rotatable member connected to the second gearbox via the rotational power transmitted to the second gearbox, and, while the rotatable member connected to the second gearbox is rotating, engaging the clutch to transmit rotational power from the first output of the first gearbox to a third gearbox to rotate a rotatable member connected to the third gearbox.

Another aspect of the invention includes another method of controlling a drive system with multiple driven rotating members. This aspect includes disengaging a clutch connected to a first output of a first gearbox, and, after the clutch is disengaged, supplying rotational power to the first gearbox. The method further includes rotating a rotatable member connected to the first gearbox via the rotational power transmitted to the first gearbox. Additionally, while the rotatable member connected to the first gearbox is rotating, the method engages the clutch to transmit rotational power from the first output of the first gearbox to a second gearbox to rotate a rotatable member connected to the second gearbox.

Another aspect of the invention provides a mixer system including a mixing chamber including a drive panel and an open top. The mixing chamber typically includes a discharge opening in at least one side and a door configured to open and close the discharge opening. The mixer system also includes a first driveline and a first mixing auger disposed inside the mixing chamber on a first side of the drive panel. A first auger drive is disposed on a second side of the drive panel and connected to the first auger through the drive panel and connected to the first driveline. A second mixing auger is typically disposed inside the mixing chamber on the first side of the drive panel. A second auger drive is typically also disposed on the second side of the drive panel and connected to the second auger through the drive panel. This aspect of the invention includes means for connecting and disconnecting the second auger drive from the first driveline independently of the first auger drive.

In some examples of the invention, three, four, five or more augers are disposed in the mixing chamber. These augers are configured to sequentially start, either individually or in groups in order to avoid having an excessive torque spike upon starting the machine.

BRIEF DESCRIPTION OF THE DRAWINGS

These and other advantages of the invention will become more apparent and more readily appreciated from the following detailed description of the exemplary embodiments of the invention taken in conjunction with the accompanying drawings where.

DETAILED DESCRIPTION OF THE PREFERRED EMBODIMENTS

Figure 1:
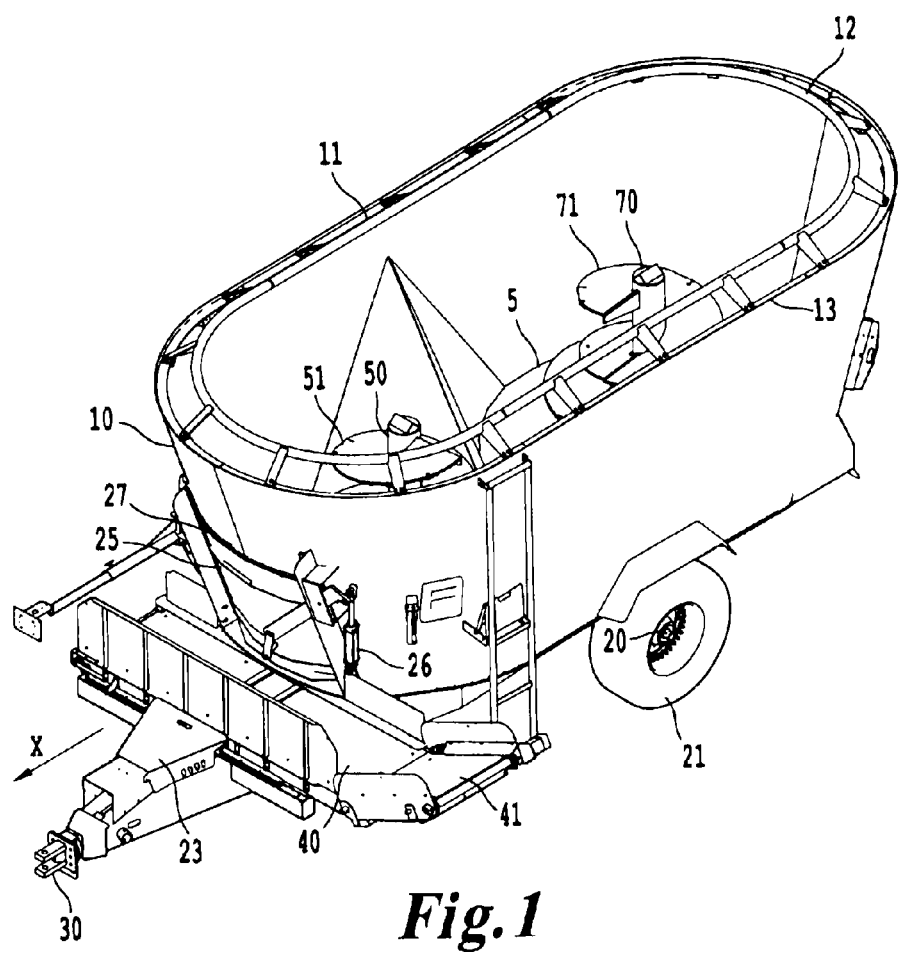
FIG. 1 is an isometric view of one example of a mixing machine in which the sequential start clutch system is installed.

With reference to FIG. 1, an isometric view of one example of a sequential start clutch system installed in a mixer 1 is shown. The mixer 1 includes a drive panel 5. In this example, the drive panel 5 is the floor of the mixer 1. In the example shown in FIG. 1, a first auger 50 and a second auger 70 are connected through the drive panel 5 to a drive train.

The mixer 1 also includes a front wall 10, a right side wall 11, a rear wall 12, and a left side wall 13. Typically, these side walls will, in combination with the drive panel 5, form a container such as a mixing chamber with one open face through which material can be deposited. In the embodiment shown in FIG. 1, the open face is the top of the mixer 1. In an alternate embodiment, the drive panel 5 is a wall of the container instead of part of the floor of the container.

As further shown in FIG. 1, the front wall 10 includes a door 25 covering an opening 27. The door 25 preferably slides to expose an opening 27 disposed in the front wall 10. While the opening 27 is shown in FIG. 1 in the front wall 10, the opening 27 can be disposed on any of the walls, for example, the left side wall 13. The door 25 is typically opened and closed via a hydraulic cylinder 26. Alternatively, the door 25 can be opened and closed manually or via an electric motor.

In the example depicted in FIG. 1, the opening 27 allows material within the container formed by the walls and drive panel 5 to flow out of the container and onto an optional distributor 40, which is configured to move the material laterally with respect to the direction of travel X of the mixer 1. The movement can be created either through gravity or through use of a motorized belt (not shown). The material deposited onto the distributor 40 then flows either to the right or left with respect to the direction of travel X depending on the orientation of the optional tiltable extension 41. The direction of travel X is controlled by the wheels 21 and axel 20 and is generally perpendicular to the axel 20.

The mixer 1 shown in FIG. 1 is configured to be pulled by a tractor or truck as a trailer. The mixer 1 in this configuration is typically pulled behind the tractor or truck via a hitch 23. Rotational power is delivered to the mixer 1 via a power-take-off (PTO) coupled to the mixer 1 via the input coupling 30. In an alternate embodiment, the mixer 1 is instead arranged on a truck, for example, within or as a substitute for the box of the truck.

As shown in FIG. 1, the first and second augers 50 and 70 preferably include some form of shaped extensions to increase the mixing effect created when the first and second augers 50 and 70 rotate. In the embodiment shown in FIG. 1, the shaped extensions are the first and second flighting 51 and 71. In combination with or in place of the flighting; kickers, spikes, or blades may protrude radially from the first and second augers 50 and 70. The type of shaped extensions protruding from the first and second augers depends on the application in which the sequential start clutch system is used. For example, the embodiment shown in FIG. 1 is typical of a feed mixer used to cut and distribute bails of hay. In other applications, the container contains manure and spreads this material as fertilizer. In these applications, the extensions may be shaped differently than they are for feed mixers.

Figure 2:
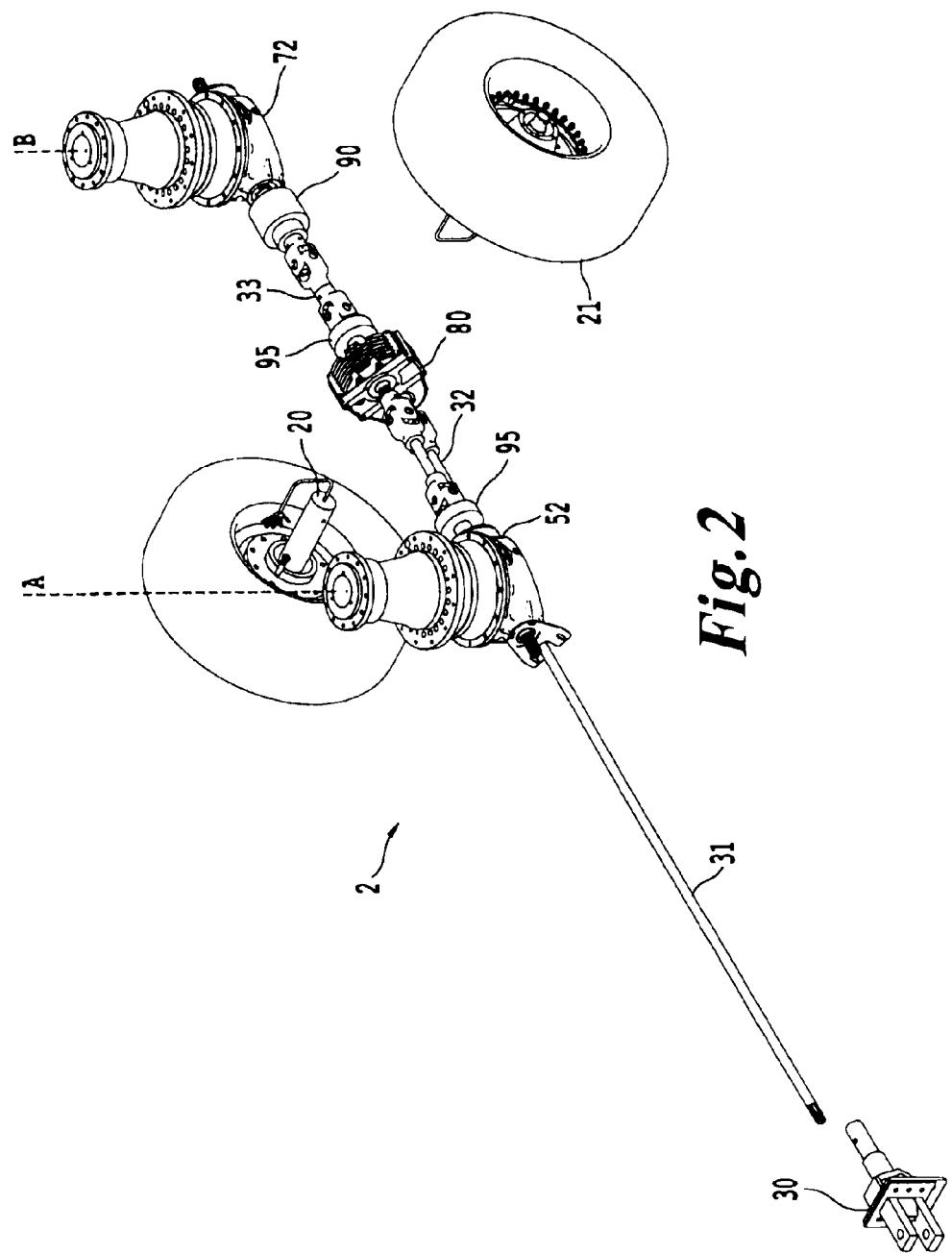
FIG. 2 is an isometric view of one example of the sequential start clutch system.
Figure 3:
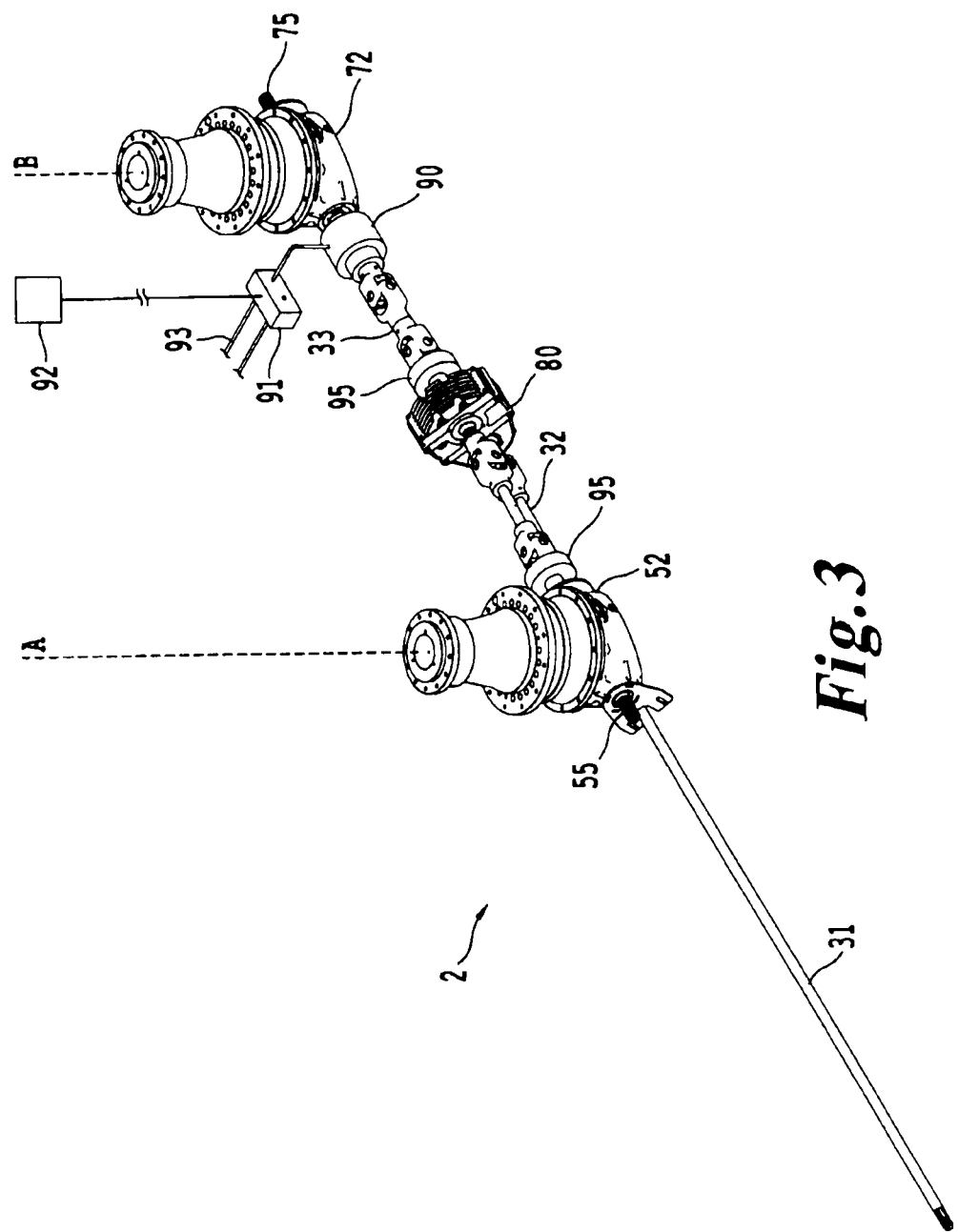
FIG. 3 is an isolated isometric view of the sequential start clutch system shown in FIG. 2.

FIGS. 2 and 3 show isometric views of a first preferred embodiment of the sequential start clutch system 2. FIG. 2 includes the wheels 21 and axel 20 from FIG. 1 for reference. As shown in FIGS. 2 and 3 as well as FIG. 4A, the input coupling 30 is connected to a first driveline 31 that is in turn connected to a gearbox 80. This embodiment is a "split-drive" arrangement, in which the rotational input from the PTO is "split" via the gearbox 80 before coupling to either of the first or second augers 50 and 70. In this embodiment, the gearbox 80 includes first and second gearbox outputs 81 and 82. First gearbox output 81 drives the first auger drive 52, and second gearbox output 82 drives the second auger drive 72. One benefit of this arrangement is that the maximum amount of torque either of the first auger drive 52 and second auger drive 72 must be able to handle is reduced as compared with embodiments in which the first auger drive 52 receives a rotational input directly from the first driveline. In this embodiment, the gearbox 80 receives rotational power from the first driveline 31 and then mechanically distributes or "splits" this rotational power to the first auger drive 52 and second auger drive 72. Therefore, if one of the augers jams due to an excessive load, the maximum amount of torque deliverable to that auger is less than if the auger were connected in series with the PTO.

Typically, the gearbox 80 reduces the rotational speed of the mechanical input received from the PTO and increases the torque available for rotating the first and second augers 50 and 70. The first auger drive 52 and second auger drive 72 then typically drive the first and second augers 50 and 70, either at the rotational speed of the output of the gearbox 80, or different, preferably reduced rotational speed. For example, the first auger drive 52 and second auger drive 72 may include right-angle gearboxes such as those built with bevel gears. The first auger drive 52 and second auger drive 72 and can act merely to change the direction of rotational power or can also act to change the rotational speed of the output relative to the rotational speed of the input. The gearbox 80 itself can be made with various types of gears such as spur gears, planetary gears, or helical gears. In one variation, the gearbox 80 reduces the rotational speed of the PTO, and the first auger drive 52 and second auger drive 72 further reduce the rotational speed. The first auger drive 52, second auger drive 72, gearbox 80, and clutch 90 together comprise a sequential start clutch system 2, which is discussed in various embodiments below.

In the first preferred embodiment shown in FIGS. 2, 3, 4A, and 5A the split-drive is provided with the gearbox 80 disposed between the first auger drive 52 and second auger drive 72, which simplifies construction because the second driveline 32 and third driveline 33 between the gearbox 80 and first auger drive 52 and second auger drive 72, respectively, are relatively short. However, in other embodiments, the gearbox 80 can be disposed ahead of the first auger drive 52 and second auger drive 72 in order to facilitate retro-fitting of old mixers.

Figure 4A:
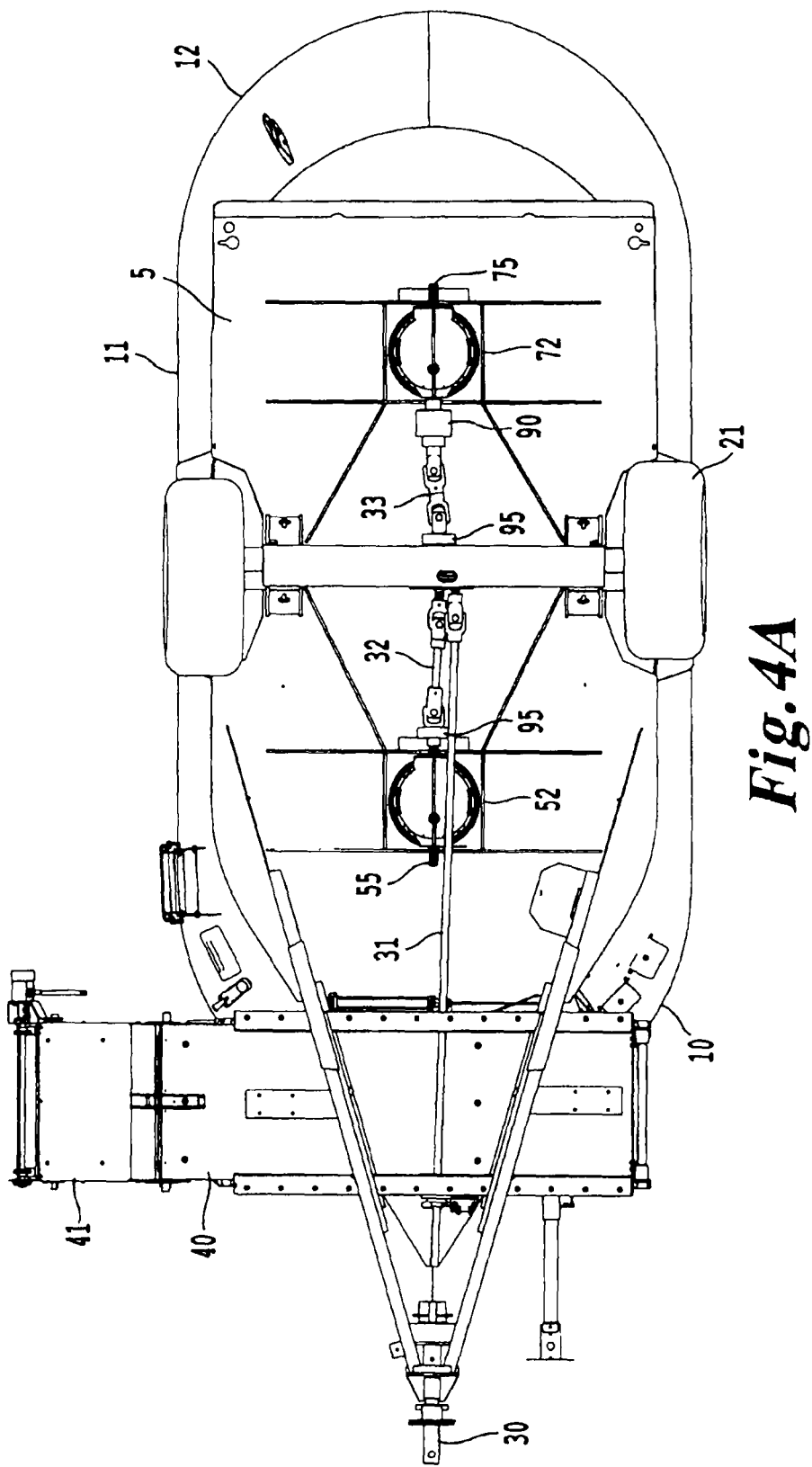
FIG. 4A is a top view of an example of the sequential start clutch system in a split-drive configuration.

As further shown in FIGS. 2, 3, and 4A, the third driveline 33 is connected in series with a clutch 90. The clutch 90 is, in one embodiment, spring biased to be in an engaged state and is disengaged when a hydraulic input (signal) is provided. One benefit of this arrangement is that the system may be installed in machines without hydraulic controls. In such an installation, the clutch will maintain engagement with the second auger drive 72, and the machine will function as if no clutch is installed, i.e., both the first auger drive 52 and second auger drive 72 will start rotating simultaneously once the PTO starts rotating. Accordingly, if the mixer 1 is towed behind a vehicle without hydraulic controls, or in which the hydraulic system has malfunctioned, the mixer 1 can still be used as a conventional mixer. The clutch 90 typically incorporates an internal cylinder (not shown) to move in response to application or removal of hydraulic pressure to engage or disengage the clutch.

Typically, the hydraulic input is provided from a hydraulic circuit controlled either by an operator or an automatic controller such as a timer or computer. In one variation, the clutch 90 is unbiased and operates entirely based on hydraulic, electrical, or mechanical inputs to engage and disengage.

Figure 5A:
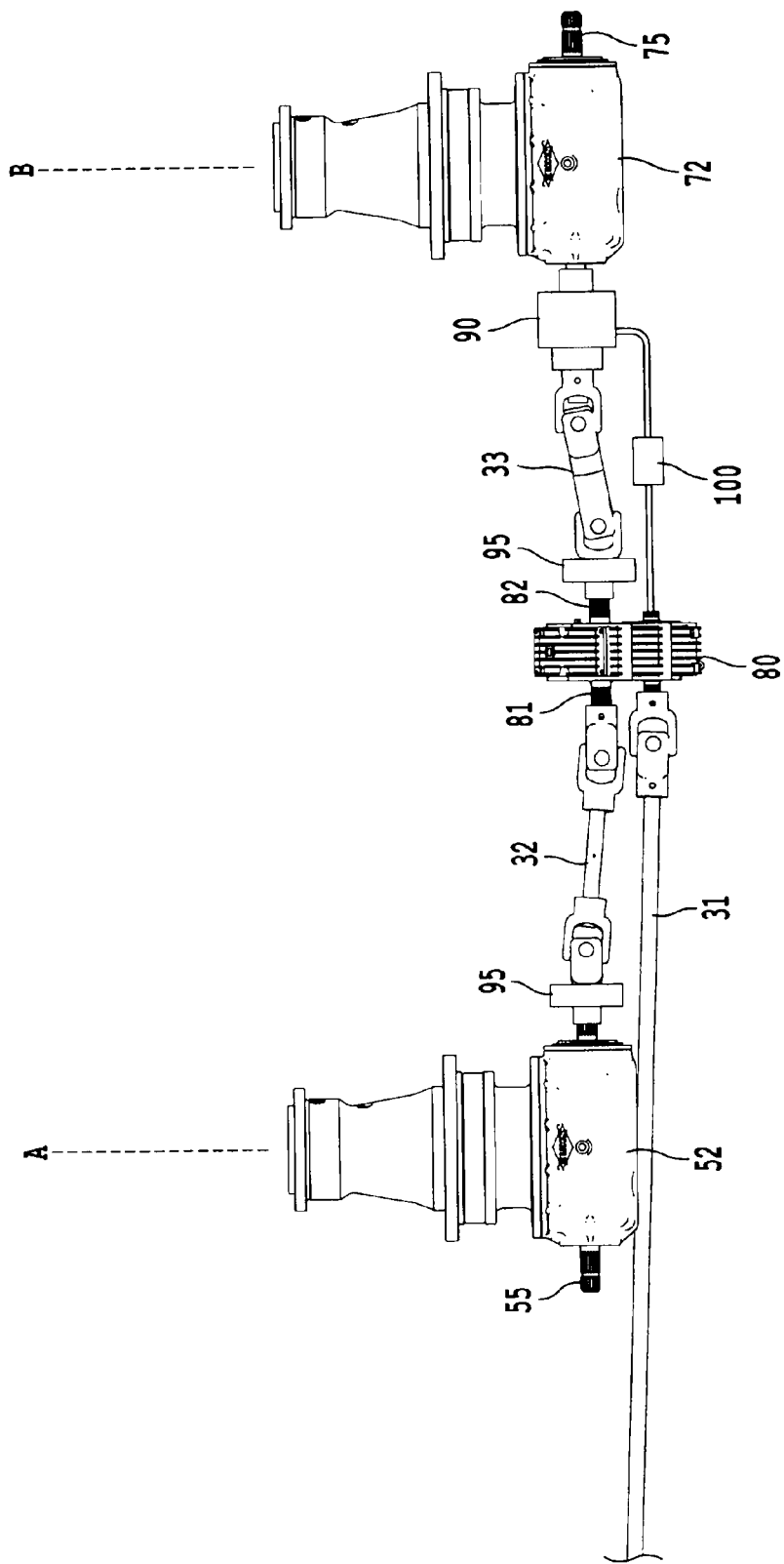
FIG. 5A is a side view of an example of the sequential start clutch system in a split-drive configuration.

One example of an automatic hydraulic control for the sequential start clutch system 2 is shown in FIG. 5A, which includes the optional automatic hydraulic control system 100. The automatic hydraulic control system 100 can be used in conjunction with most embodiments of the sequential start clutch system 2 and includes a hydraulic pump 110. The hydraulic control system 100 optionally includes a sequence valve 120 and/or a reservoir 130.

In operation, the operator starts the PTO, and the first driveline 31 begins to rotate. The first driveline 31 supplies rotational power to the gearbox 80, and the second driveline 32 and third driveline 33 begin to rotate. In other words, the first driveline 31 "drives" the gearbox 80. As the second driveline 32 is connected to the first auger drive 52 directly (except for an optional torque limiting device 95 and flexible joints such as universal joints), the first auger drive 52 begins to rotate the first auger 50 around the axis "A." Thus, the PTO drives the gearbox 80, which in turn splits the rotational power supplied by the PTO into two separate outputs, one that drives the first auger drive 52 and another that drives, with or without delay, the second auger drive 72 through the clutch 90. The clutch 90 can be positioned either before or after the third driveline 33 so long as it controls whether the second auger drive 72 receives rotational power from the first driveline 31. Additionally, one or more torque limiting devices can be connected in series with the clutch 90.

In a first example, the operator waits until the first auger drive 52 begins to rotate and then activates the clutch 90, typically by releasing hydraulic pressure on the clutch 90 via a hydraulic line 93 connected in series with a hydraulic valve 91. In this example, the clutch 90 is spring biased in an engaged position, and hydraulic pressure disengages the clutch 90. Alternatively, in another embodiment, the operator may supply hydraulic or mechanical pressure to the clutch 90 to engage the clutch 90. In either case, the operator may have a switch in an area where the operator sits, and the switch can hydraulically, mechanically, or electrically engage or disengage the clutch 90 on command. In any event, once the clutch 90 is engaged, the second auger 70 begins to rotate around the axis "B" based on rotational power provided by the PTO.

When the optional automatic hydraulic control system 100 is used, the hydraulic pump 110 is coupled to a rotating component such as first and second gearbox outputs 81 and 82, the first driveline 31 or the second driveline 32. With this optional system, the clutch 90 is typically set to be normally disengaged and to engage in response to hydraulic pressure rather than to be normally engaged and to disengage in response to hydraulic pressure as discussed previously. In other words, the clutch 90 is configured to engage upon receipt of a hydraulic pressure signal.

Preferably, the hydraulic pump 110 is mechanically coupled to the first gearbox output 81 or second driveline 32 in order to rotate in unison with the first auger drive 52. One benefit of this arrangement is that the development of hydraulic pressure in the hydraulic pump 110 is correlated to rotation of the first auger drive 52 and the first auger 50. When the first auger 50 begins to rotate, the hydraulic pump 110 builds hydraulic pressure and supplies pressure to the clutch 90, thereby causing the clutch 90 to engage the second auger drive 72 and to rotate the second auger 70. In other words, the rotational energy of one of the rotating components creates hydraulic pressure via the hydraulic pump 110, which in turn is used to actuate the clutch 90. In this way, rotation of the second auger 70 depends on and is delayed relative to rotation of the first auger 50.

Figure 8A:
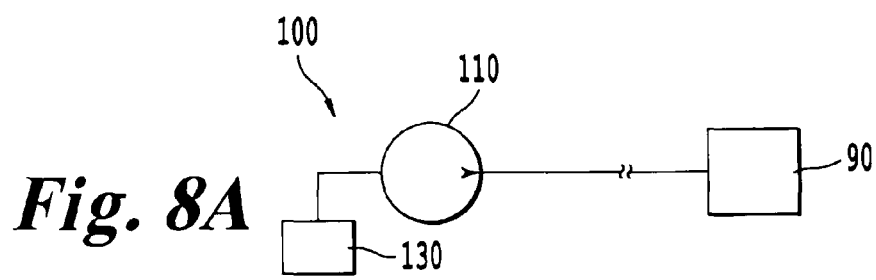
FIGS. 8A-8D are schematics of examples of a hydraulic control circuit that is optionally used to control actuation of a clutch.

FIG. 8A shows a basic configuration of the hydraulic control system 100 in which the hydraulic pump 110 simply supplies hydraulic pressure to the clutch when the first gearbox output 81 or second driveline 32 rotates, and, when the pump 110 stops rotating, pressure developed by the hydraulic pump 110 and applied to the clutch 90 diminishes as fluid flows backwards through the pump.

Figure 8B:
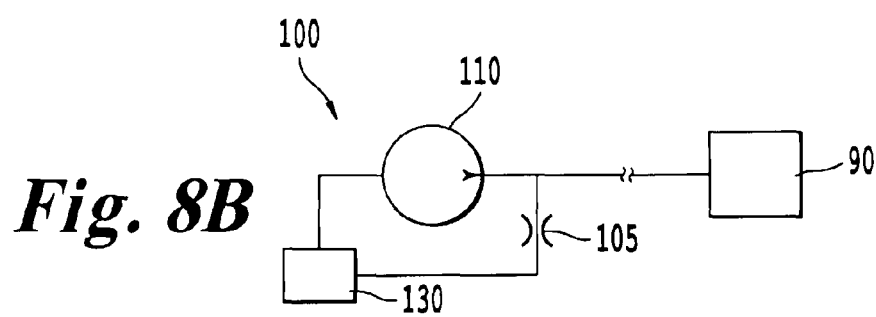

In some cases, the hydraulic pump 110 may not permit sufficient backflow to release the pressure on the clutch 90 as desired. Accordingly, a further example of the of the hydraulic control system 100 is shown in FIG. 8B and includes an orifice 105, which allows flow discharged from the front of the pump 110 to recirculate to the inlet of the pump 110, but causes backpressure to build up when the pump 110 operates. The backpressure causes the clutch 90 to engage.

Figure 8C:
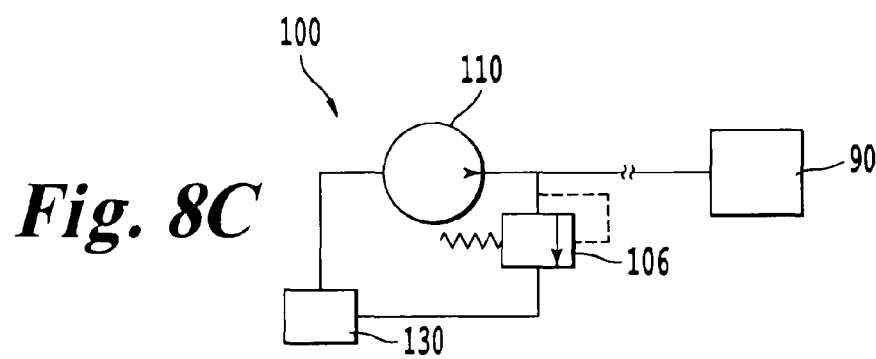

A further example of the hydraulic control system 100 is shown in FIG. 8C, in which the orifice 105 is replaced with a relief valve 106. In this example, the relief valve is set at a predetermined pressure threshold. When the pump 110 operates, the pump pressurizes the line leading to the clutch 90 and actuates a cylinder inside or attached to the clutch 90 to cause the clutch 90 to engage.

Figure 8D:
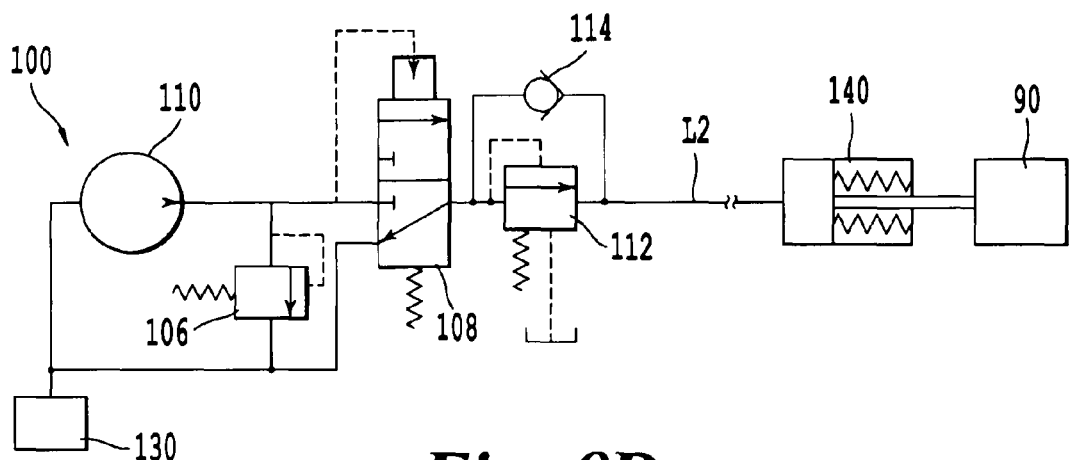

FIG. 8D shows a further embodiment of the hydraulic control system 100. As it is usually preferable for the clutch 90 to engage somewhat suddenly in order to avoid excessive slippage within the clutch 90, the example of the hydraulic control system 100 shown in FIG. 8D incorporates a relief valve 106 connected in parallel with a diverter valve 108. The diverter valve is connected in series with a sequence valve 112, which is either directly connected to the clutch 90 or connected to an external cylinder 140 that actuates the clutch in response to receiving a hydraulic pressure signal. The sequence valve is configured to pass fluid only when a predetermined threshold pressure is reached. Once the pump 110 develops the predetermined amount of pressure, the sequence valve 112 opens and allows the clutch 90 or external cylinder 140 to receive pressure from the pump. Thus, the sequence valve 112 operates similarly to a relief valve, but is used to build pressure to a set point prior to letting oil through, and to maintain that pressure. The arrangement shown in FIG. 8D typically provides a relatively "sudden" engagement of the clutch 90, and therefore, prevents undue wear of the clutch caused by slippage. Said differently, the clutch 90 is either in an "on" position or an "off" position, not somewhere in-between. In a variation of the example shown in FIG. 8D, the sequence valve 112 is omitted, typically resulting in a small increase in the amount of time the clutch 90 takes to engage once the diverter valve 108 opens.

As the time required to actuate the clutch 90 depends on the bore and stroke of the cylinder and the size of the pump used to actuate the clutch 90, it is sometimes preferable to use the external cylinder 140 as shown in FIG. 8D to actuate the clutch 90. The external cylinder 140 allows a user to specifically select a suitable bore and stroke for a given force requirement and pump displacement, and thus specifically select the time delay between actuation of the first auger drive 52 and the second auger drive 72 for the specific type of mixing to be performed by mixer. By making the cylinder external, it is relatively simple for a user to select a bore and stroke that provide an appropriate force and delay. In other words, replacing one external cylinder 140 with different external cylinder 140 having a different bore and stroke will change the amount of time delay between actuation of the first auger drive 52 and the second auger drive 72. A similar change could be accomplished by changing the pump size while retaining the same cylinder.

Whether the clutch 90 uses an internal cylinder or an external cylinder 140, the flow circuit shown in FIG. 8D remains the same with respect to the pump 110, relief valve 106, and reservoir 130, which serves to supply fluid to the loop formed between the pump 110, diverter valve 108, and reservoir 130.

After the pump 110 stops running, i.e., the first gearbox output 81 or second driveline 32 have stopped rotating, a spring disposed inside the clutch 90 or in the external cylinder 140 pushes hydraulic fluid out of the clutch 90 or external cylinder and back into line L2. The hydraulic fluid flows through the check valve 114, diverter valve 108, and into the reservoir 130. Once the pressure is released from the clutch 90 or external cylinder 140, the clutch 90 disengages and is thus made ready to reengage with the appropriate delay when the first gearbox output 81 or second driveline 32 begin to rotate again.

By staging the start of rotation of each of the first auger drive 52 and second auger drive auger 72 by one or more of the methods discussed above, the maximum amount of torque transmitted through the gearbox 80, first driveline 33, and PTO is less. In other words, by delaying the start of the second auger 70 until after the first auger 50 is already rotating, the startup torque for the second auger 70 is not applied at the same moment the startup torque for the first auger 50 is applied. Thus, if the startup torque for each of the augers is 2000 ft·lbs, and the running torque for each of the augers is 300 ft·lbs, the maximum torque placed on the first driveline 31 is 300 ft·lbs (first auger 50 running torque)+2000 ft·lbs (second auger 70 startup torque)=2300 ft·lbs. This arrangement provides a significant reduction in startup torque from the 4000 ft·lbs startup torque created when both augers are started simultaneously. The reduction in startup torque provides greater working life for various components in the drive train and allows for some components to be reduced in size.

The above-noted arrangement can be applied to mixers with more than two augers. For example, in one variation, the two or more first augers 50 are connected to two or more first auger drives 52 such that these two or more augers 50 both begin to rotate when the PTO is activated. Additionally, two or more second auger drives 72 may be connected to two or more gearboxes 80 via two or more clutches 90 and so on.

Furthermore, three or more augers may be connected such that one of the augers starts, then a clutch controlling a second auger engages so as to start that auger rotating, and then a second clutch may be engaged to start a third auger. In other words, the system is scalable to any number of augers such that the different augers start rotating at different times. In one variation different groups of multiple augers start rotating at different times. In another combination, single augers start rotating at different times based on when different clutches engage.

In a second example of the invention, the clutch 90 is controlled by an automatic controller 92 (shown in FIG. 3). The automatic controller 92 can be a timer, computer, or PLC configured to turn on or off the hydraulic valve 91 that supplies a hydraulic signal to the clutch 90. In one example, the automatic controller 92 engages the clutch 90 five seconds after the PTO is engaged.

In one variation of the second example, the automatic controller controls whether the PTO rotates or not, and the automatic controller engages the clutch 90 with the second auger drive 72 a predetermined amount of time after the controller to starts rotation of the PTO. Preferably, the controller 92 engages the clutch within 0.1 to 5 seconds, and more preferably within 1 to 3 seconds after the PTO is engaged.

Figure 4B:
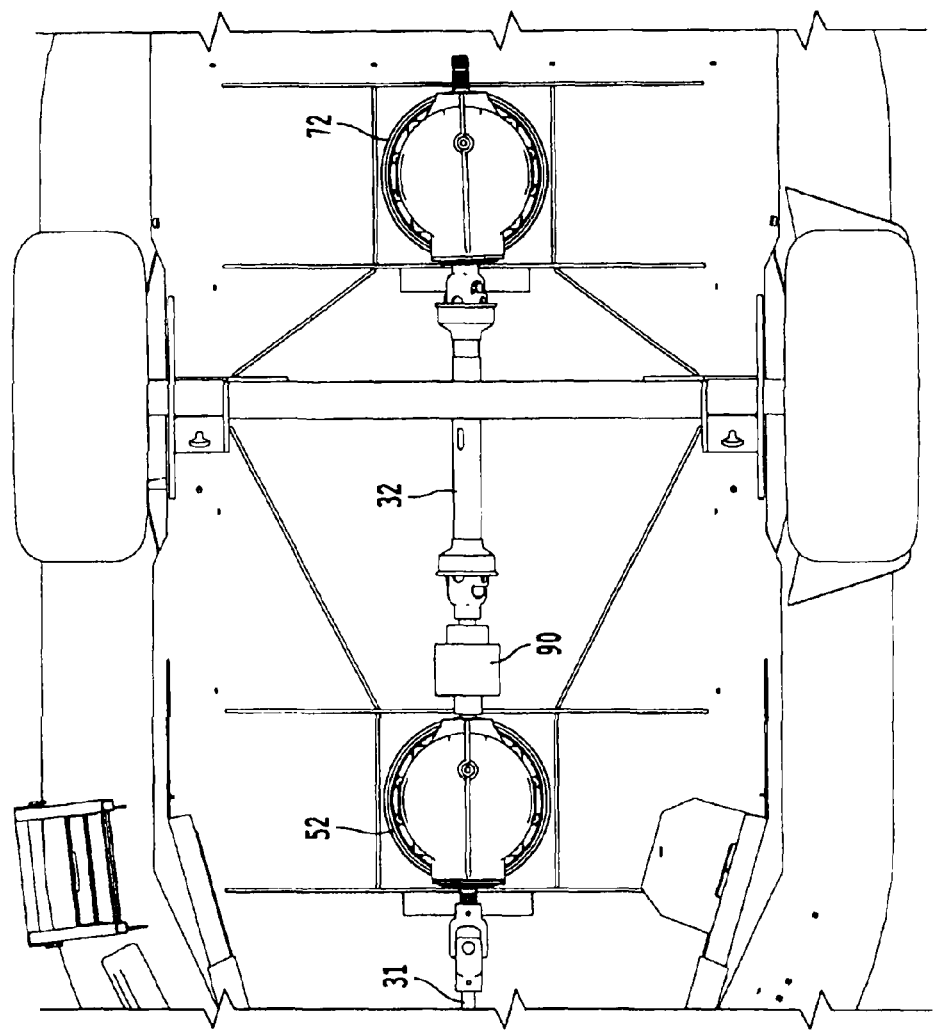
FIG. 4B is a top view of an example of the sequential start clutch system in a serial-drive configuration.
Figure 5B:
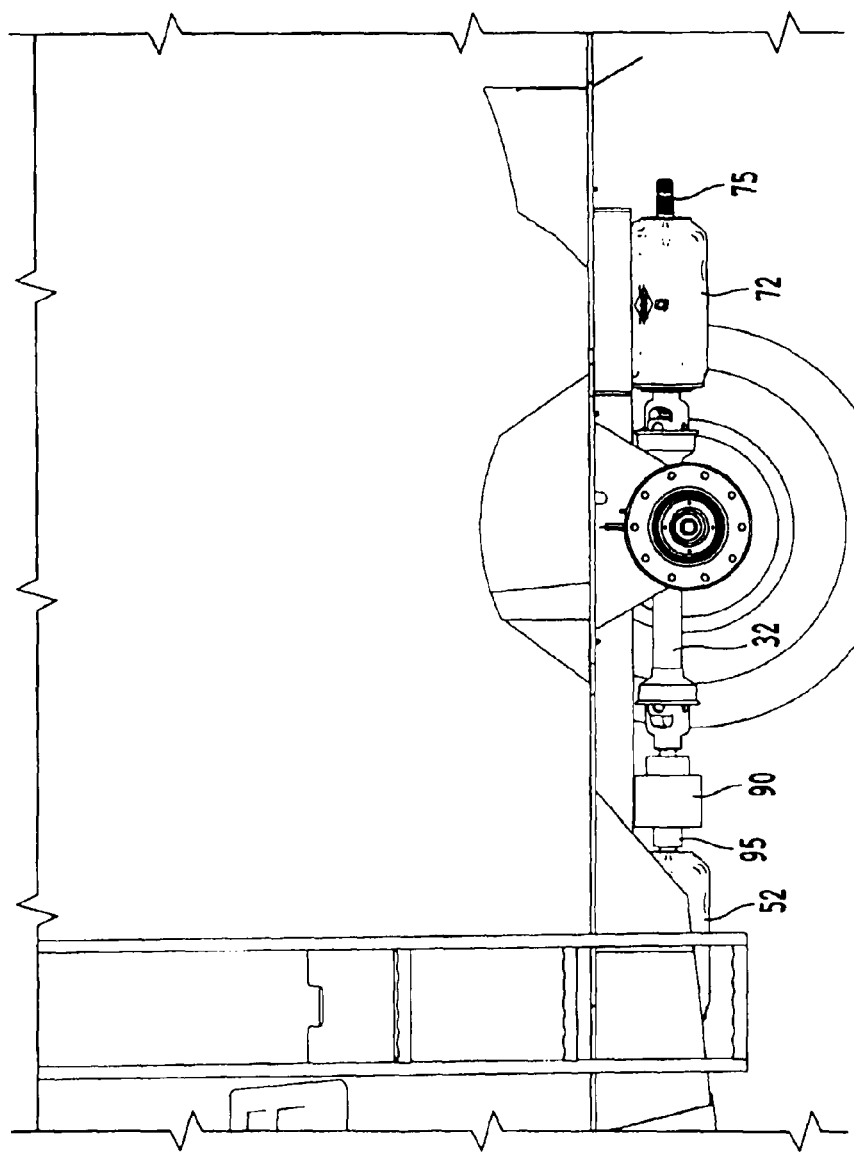
FIG. 5B is a side view of an example of the sequential start clutch system in a serial-drive configuration.

In FIGS. 4B and 5B, a second preferred embodiment is shown in which the gearbox 80 is omitted. In this embodiment, the first driveline 31 is connected to the first auger drive 52 without any "split" in the rotational power transmitted via the PTO. The first auger drive 52 itself will split the rotational power transmitted from the PTO by driving the first auger 50 and providing a second output that is connected in series with the second auger drive 72. Typically, the first auger drive 52 is built with enough capacity to handle the direct feed of torque transmitted from the PTO and to distribute this power to the first auger 50 and second auger drive 72. In other words, while the gearbox 80 is omitted, the first auger drive 52 performs part of the function of the gearbox 80. Optionally, a torque limiting device 95 may be placed in series between the PTO and the first auger drive 52. In this embodiment, the clutch 90 is connected between the first auger drive 52 and the second auger drive 72. Thus, when the clutch 90 is engaged, the second auger drive 72 can be activated as discussed above in the first preferred embodiment.

The second preferred embodiment shown in FIGS. 4B and 5B can be combined with the optional hydraulic control system 100 the same way the embodiment shown in FIG. 4A can. For example, the hydraulic pump 110 can be connected in series with the first driveline 31 or the first auger drive 52. Once the hydraulic pump 110 develops sufficient pressure due to rotation based on the movement of the first driveline 31 or first auger drive 52, the clutch 90 will engage in response to the hydraulic pressure, either directly, or through the external cylinder 140.

Figure 6:
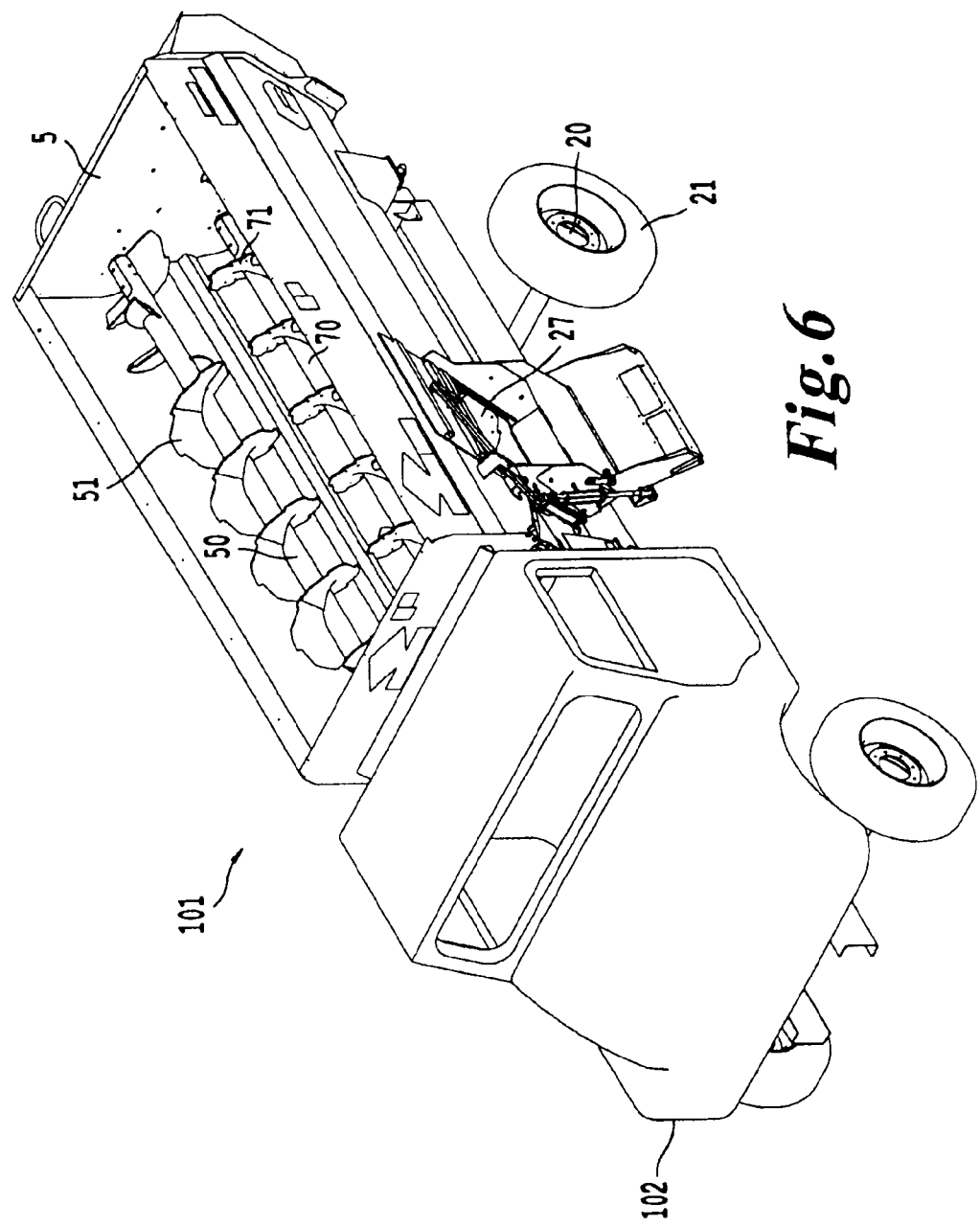
FIG. 6 is an isometric view of an alternate example of a mixing machine in which the sequential start clutch system is installed.

FIG. 6 shows another embodiment of a mixing machine in which the sequential start clutch is installed. In this embodiment, the mixer 101 is installed on a truck 102. The mixer 101, in the depicted embodiment, includes two augers 50 and 70, arranged to rotate around horizontal axes of rotation rather than vertical. It should be noted that in both the truck mounted version and the trailer mounted version, the augers 50 and 70 can be arranged to rotate around vertical, horizontal, or even obliquely angled axes of rotation. In the depicted embodiment, the mixer 101 includes a drive panel 5, and the augers 50 and 70 include first and second flighting 51 and 71, respectively. The mixer 101 includes an opening 27 arranged on a sidewall in the depicted example. However, the opening 27 can be positioned on the rear wall of the mixer 101, if desired.

Figure 7:
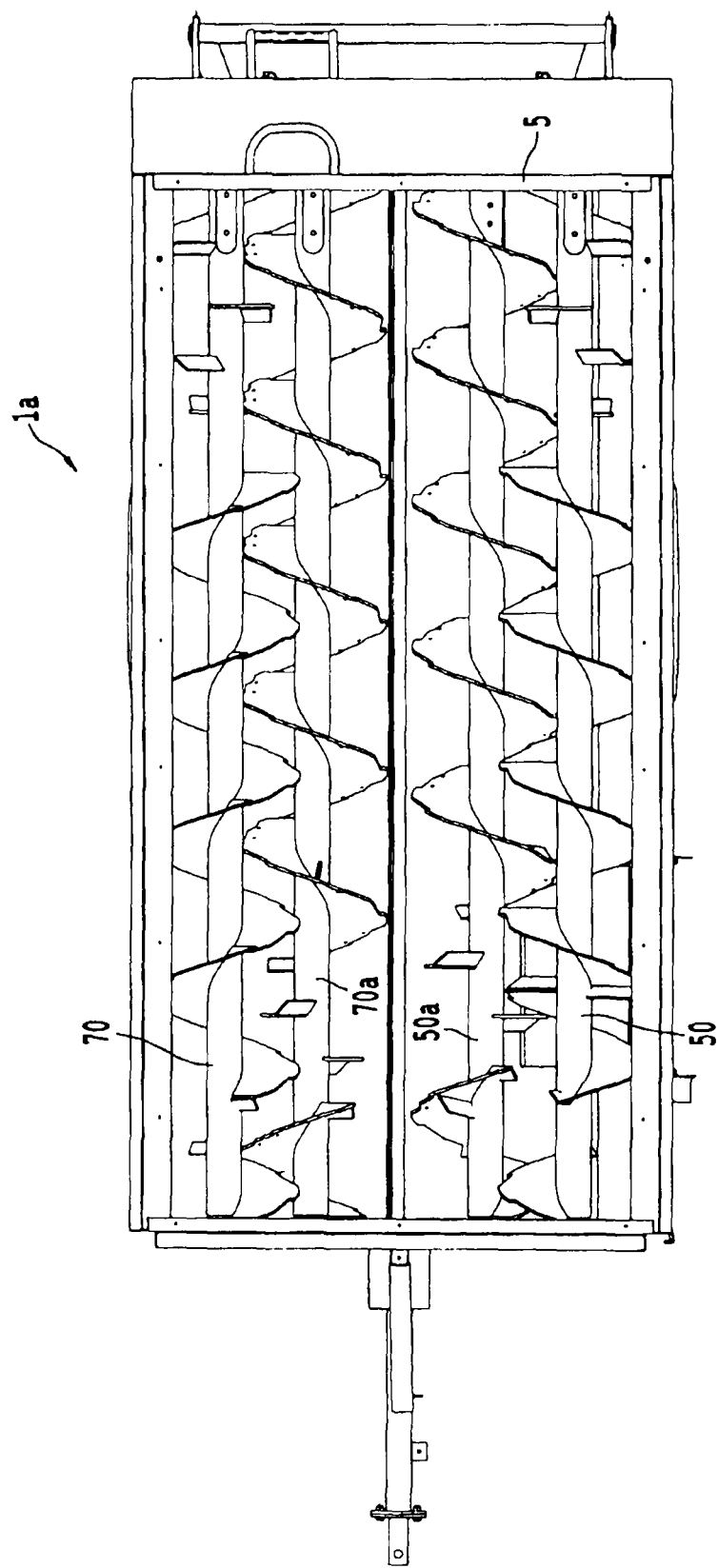
FIG. 7 is a top view of one example of a manure spreader in which the sequential start clutch system is installed.

FIG. 7 shows another example of a machine, a manure spreader 1a, in which the sequential start clutch system is installed. In this example, the augers 50 and 70 are each complimented by augers 50a and 70a, respectively. As discussed above, any number of augers may be connected in any combination. In the depicted example, the drive panel 5 is in the rear of the manure spreader 1a with respect to the direction of travel. However, in other embodiments, the drive panel 5 is arranged in the front or on a side wall of the manure spreader 1a. Similarly, the drive panel 5 is sometimes formed on the bottom of the manure spreader 1a as shown in the mixer 1.

In the description above, it should be noted that when the term "hydraulic" is used, it should be understood to include any type of pressurized fluid such as hydraulic fluid, compressed air, or other types of fluid used to perform mechanical work.

Although only certain embodiments of this invention have been described in detail above, those skilled in the art will readily appreciate that many modifications are possible in the exemplary embodiment without materially departing from the novel teachings and advantages of this invention. Accordingly, all such modifications are intended to be included within the scope of this invention.

The invention claimed is:

1. A mixer system comprising:
    a mixing chamber including a drive panel and an open top;
    a discharge opening in a side of the mixing chamber;
    a door configured to open and close the discharge opening;
    a first driveline;
    a first mixing auger disposed inside the mixing chamber on a first side of the drive panel;
    a first auger drive disposed on a second side of the drive panel and connected to the first auger through the drive panel and mechanically coupled in series with the first driveline;
    a second mixing auger disposed inside the mixing chamber on the first side of the drive panel,
    a second auger drive disposed on the second side of the drive panel and connected to the second auger through the drive panel;
    a pump coupled with the first auger drive and configured to develop hydraulic pressure in response to rotation of the first auger drive; and
    a clutch disposed on the second side of the drive panel and mechanically connected between the second auger drive and the first driveline and configured to mechanically connect the second auger drive to the first driveline in response to the hydraulic pressure developed by the pump such that the second auger drive rotates in response to rotation of the first driveline while the hydraulic pressure is above a predetermined threshold.

2. The mixer system according to claim 1, further comprising a sequence valve disposed in a hydraulic line connecting the pump and the clutch and configured to open when the hydraulic pressure developed by the pump reaches the predetermined threshold such that the clutch engages after the sequence valve opens.

3. The mixer system according to claim 2, further comprising a relief valve connected in parallel to the sequence valve with respect to an outlet of the pump.

4. The mixer system according to claim 1, further comprising a check valve connected to allow fluid to flow away from the clutch.

5. The mixer system according to claim 1, further comprising a fluid actuating cylinder connected in fluid communication with the pump and externally coupled to the clutch and configured to engage the clutch in response to receiving increased fluid pressure.

6. The mixer system according to claim 1, wherein the mixer system comprises more than two augers.

7. The mixer system according to claim 1, wherein the pump is disposed upstream of the first auger.

8. The mixer system according to claim 1, wherein the pump is disposed downstream of the first auger.

9. The mixer system according to claim 1, further comprising a controller configured to control the clutch.

* * * * *